United States Patent [19]

Hibino et al.

[11] Patent Number: 4,770,148

[45] Date of Patent: Sep. 13, 1988

[54] METHOD OF CONTROLLING OPERATION OF INTERNAL COMBUSTION ENGINES IN DEPENDENCE UPON INTAKE AIR TEMPERATURE

[75] Inventors: Yoshitaka Hibino; Takeshi Fukuzawa; Hiromitsu Sato; Masahiko Asakura, all of Wako, Japan

[73] Assignee: Honda Giken Kogyo Kabushiki Kaisha, Tokyo, Japan

[21] Appl. No.: 1,404

[22] Filed: Jan. 8, 1987

[30] Foreign Application Priority Data

Jan. 10, 1986 [JP] Japan ................................. 61-003167

[51] Int. Cl.⁴ ..................... F02M 51/00; F02M 25/06; F02D 41/06
[52] U.S. Cl. .................................... 123/491; 123/435; 123/571

[58] Field of Search ............... 123/179 G, 179 L, 435, 123/438, 491, 494, 568, 569, 571, 480; 478; 364/431.05, 431.07, 431.06

[56] References Cited

U.S. PATENT DOCUMENTS

| | | | |
|---|---|---|---|
| 4,485,625 | 12/1984 | Fujimoto et al. | 123/571 X |
| 4,499,879 | 2/1985 | Stoltman et al. | 123/480 |
| 4,578,996 | 4/1986 | Abe et al. | 123/491 X |
| 4,599,694 | 7/1986 | Aposchanski et al. | 364/431.05 |
| 4,644,474 | 2/1987 | Aposchanski et al. | 123/494 X |

*Primary Examiner*—Willis R. Wolfe
*Attorney, Agent, or Firm*—Lyon & Lyon

[57] ABSTRACT

A temperature of an internal combustion engine is sensed when the engine is started and elapsed time from engine start is also sensed. Engine intake air temperature is estimated on the basis of the sensed engine temperature and sensed elapsed time. The operation of the engine is controlled in accordance with the estimated engine intake air temperature.

8 Claims, 4 Drawing Sheets

METHOD OF CONTROLLING OPERATION OF INTERNAL COMBUSTION ENGINES IN DEPENDENCE UPON INTAKE AIR TEMPERATURE

BACKGROUND OF THE INVENTION

This invention relates to a method of controlling the operation of an internal combustion engine, and more particularly, to such method in which the operation of the engine is controlled depending on the intake air temperature thereof.

One example of a method available for controlling the operation of an internal combustion engine is exhaust gas recirculation (EGR) for returning part of engine exhaust gases to the intake system of the engine. However, when a control method of this type is applied under a condition where the fuel supplied to the engine is not sufficiently atomized, the state of fuel combustion within the engine generally will be adversely affected, resulting in a decline in the operating performance of the engine.

Since the degree of atomization of fuel supplied to an internal combustion engine is dependent upon the engine coolant temperature, it has been proposed to sense the engine coolant temperature and initiate the exhaust gas recirculation operation when the sensed value of coolant temperature exceeds a predetermined value of. Such an arrangement is disclosed in e.g. Japanese Provisional Patent Publication (Kokai) No. 61-81568.

A problem with such an arrangement is that a decline in the degree of fuel atomization can occur when the engine intake air temperature is lower than normal (e.g. 15° C. or less), even though the engine coolant temperature is slightly higher than the aforementioned predetermined value. Conventionally, this problem is dealt with by setting the predetermined value of engine coolant temperature to a somewhat high value (e.g. 75° C.) and starting exhaust recirculation when the engine coolant temperature exceeds this value. An alternative approach is to mount an intake air temperature sensor in the engine intake pipe and suspend the exhaust gas recirculation when the sensed value of intake air temperature is lower than a predetermined value.

However, the former attempt at a solution delays the start of control and results in a deterioration in an exhaust gas scrubbing function. The latter approach involves control equipment of some complexity and is impractical in terms of cost as well.

SUMMARY OF THE INVENTION

It is therefore an object of the invention to provide an internal combustion engine operation control method which is capable of starting a control operation for an internal combustion engine depending on engine intake air temperature without a delay after the start of the engine.

It is a further object to enable the operation of an internal combustion engine to be controlled depending on engine intake air temperature without using an intake air temperature sensor, thereby curtailing the manufacturing cost of a control system to which the method of the invention is applied.

According to the present invention, the foregoing object is attained by providing a method of controlling the operation of an internal combustion engine comprising the steps of:

(a) sensing a temperature of the engine from a moment at which the engine is started, and elapsed time from the moment at which the engine is started;

(b) estimating the temperature of intake air being supplied to the engine, on the basis of the sensed temperature of the engine and the sensed elapsed time; and (c) controlling the operation of the engine in accordance with the estimated temperature of the intake air.

Preferably, the above step (b) comprises determining whether the sensed temperature of the engine is lower than a predetermined value at the moment at which the engine is started, and when the sensed temperature of the engine is determined to be lower than the predetermined value, estimating that the temperature of the intake air is at a low value which would result in an insufficient degree of atomization of fuel being supplied to the engine, until a predetermined period of time elapses from the moment at which the engine is started.

Also preferably, the above step (b) comprises: determining whether the sensed temperature of the engine is lower than a first predetermined value at the moment at which the engine is started; determining whether the sensed temperature of the engine rises above a second predetermined value higher than the first predetermined value with elapse of a predetermined period of time from the moment at which the engine is started, if the sensed temperature of the engine is determined to be lower than the first predetermined value; when the sensed temperature of the engine is determined to be lower than the second predetermined value when the predetermined period of time elapses, estimating that the temperature of the intake air is at a low value which would result in an insufficient degree of atomization of fuel being supplied to the engine; and when the sensed temperature of the engine is determined to be higher than the second predetermined value when the predetermined period of time elapses, estimating that the temperature of the intake air is at a high value which would result in a sufficient degree of atomization of fuel being supplied to the engine.

Preferably, the above step (b) further comprises determining whether the sensed temperature of the engine is higher than a third predetermined value higher than the second predetermined value, and when the sensed temperature of the engine is higher than the third predetermined value even before the predetermined period of time elapses, immediately estimating that the temperature of the intake air is at the high value.

Preferably, the above temperature of the engine is the temperature of coolant for the engine.

The above step (c) may comprise controlling exhaust gas recirculation to an intake system of the engine.

According to the method of the invention constructed as above, the operation of the engine can be controlled based on intake air temperature by an arrangement which is inexpensive since an intake air temperature sensor need not be specially provided, and such control can be performed without a delay after the start of the engine.

The above and other objects, features and advantages of the invention will be apparent from the following detailed description taken in conjunction with the accompanying drawings.

DETAILED DESCRIPTION

A preferred embodiment of a method in accordance with the invention will now be described with reference to the accompanying drawings.

Figure 1:
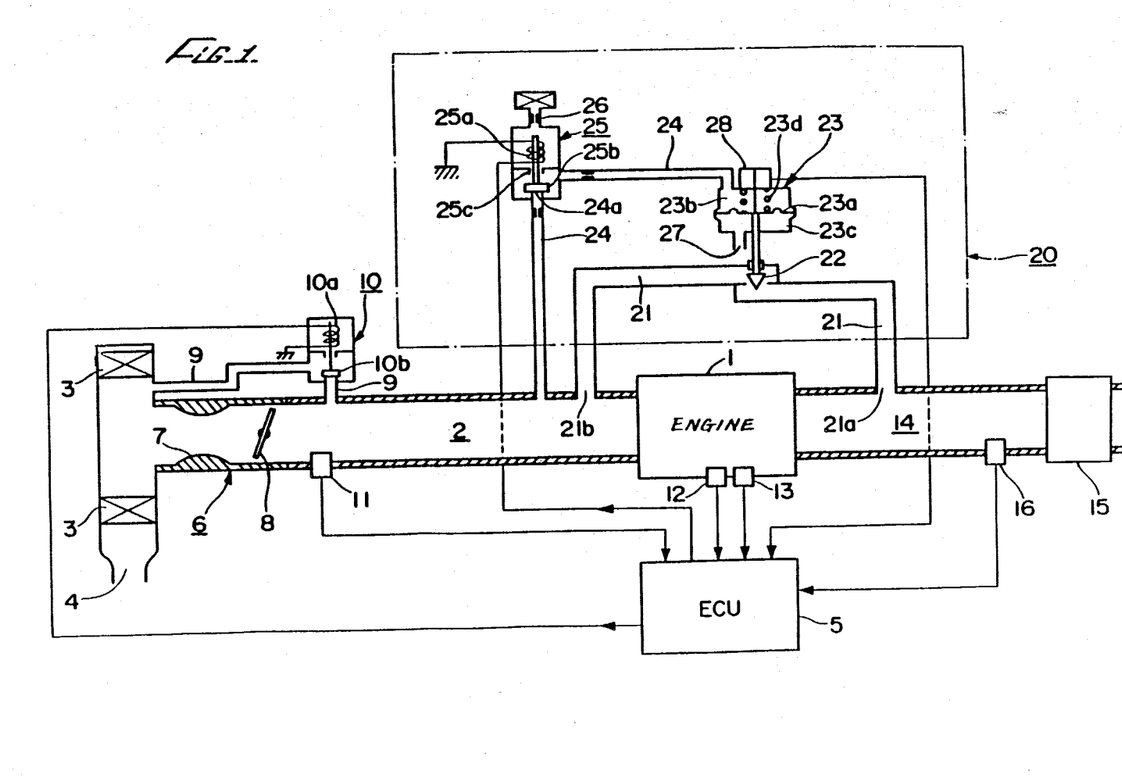
FIG. 1 is a block diagram illustrating the overall construction of an internal combustion engine equipped with an exhaust gas recirculation control system to which the method of the invention is applied.

FIG. 1 shows the overall construction of an exhaust gas recirculation control system to which the method of the invention is applied. An internal combustion engine, designated by numeral 1, is e.g. of the four-cylinder type and has one end of an intake pipe 2 connected thereto. The intake pipe 2 has its other end communicating with an atmosphere intake 4 via an air cleaner 3 and is provided at a point along its length with a carburetor 6 including a venturi 7 and a nozzle, which is not shown. Arranged in the intake pipe downstream of the carburetor 6 is a throttle valve 8. Arranged downstream of the throttle valve 8 is a secondary air supply passageway (hereinafter referred to simply as an "air passageway") 9 for intake communicating with the air cleaner 3. An electromagnetic valve 10 is arranged in the air passageway 9 at a point therealong and comprises a solenoid 10a and a valve body 10b for opening and closing the air passageway 9 in response to the state of energization of the solenoid 10a. The latter is electrically connected to an electronic control unit (hereinafter referred to as the "ECU") 5.

An absolute pressure (PBA) sensor 11 is provided in communication with the interior of the intake pipe 2 between the engine 1 and the throttle valve 8 for producing an electric signal indicative of absolute pressure in the intake pipe 2 and delivering the signal to the ECU 5. The engine 1 has an engine coolant temperature (Tw) sensor 12 mounted in its cylinder block for supplying the ECU 5 with an electric signal indicative of the value of coolant temperature sensed thereby.

An engine rotational speed sensor (hereinafter referred to as the "Ne sensor") 13 is arranged in facing relation to the engine camshaft or crankshaft, neither of which is shown. The Ne sensor 13 outputs a top dead center (TDC) signal pulse at a crank angle position which is a predetermined crank angle before top dead center at the start of the suction stroke of each cylinder. The TDC signal is delivered to the ECU 5.

A three-way catalyst 15 is arranged in an exhaust pipe 14 of the engine 1 for scrubbing the toxic components HC, CO, and NOx in the exhaust gases. An oxygen concentration ($O_2$) sensor 16 is provided in the exhaust pipe 14 at a location upstream of the three-way catalyst 15 for sensing the concentration of oxygen in the exhaust gases and for supplying the ECU 5 with a signal indicative of the value of the oxygen concentration sensed thereby.

The engine 1 is provided with an exhaust return mechanism 20 constituting part of the exhaust gas recirculation control system. The mechanism 20 has an exhaust return passageway 21. The latter has an end 21a communicating with the interior of the exhaust pipe 14 upstream of the three-way catalyst 15 and the other end 21b communicating with the interior of the intake pipe 2 downstream of the throttle valve 8. An exhaust return valve 22 for controlling the amount of exhaust return is arranged in the exhaust return passageway 21 at a point therealong. The exhaust return valve 22 is operatively connected to a diaphragm 23a of a negative pressure-responsive device 23. The latter has a negative pressure chamber 23b and a lower chamber 23c defined by the diaphragm 23a. A spring 23d installed in a compressed state in the negative pressure chamber 23b urges the diaphragm 23a in a direction that closes the exhaust return valve 22. The lower chamber 23c communicates with the atmosphere through an air passageway 27, and the negative pressure chamber 23b communicates with the interior of the intake pipe 2 downstream of the throttle valve 8 through a negative pressure passageway 24 having a restriction. A three-way electromagnetic valve 25 is arranged in the negative pressure passageway 24 at a point along its length. The three-way valve 25 has a solenoid 25a, valve body 25b and an aperture 25c communicating with the atmosphere through an atmosphere passageway 26 having a filter and a restriction. When the solenoid 25a is energized, the valve body 25b closes the aperture 25c and opens the negative pressure passageway 24, thereby introducing the negative pressure inside intake pipe 2 downstream of the throttle valve 8 to the negative pressure chamber 23b of the negative pressure-responsive device 23. As a result, a pressure differential is produced across the diaphragm 23a, so that the diaphragm 23a is displaced against the force of spring 23d to open the exhaust return valve 22.

Thus, when the solenoid 25a of three-way electromagnetic valve 25 is energized with an increased duty ratio, the return valve 22 is opened to a substantially wider degree to permit some of the exhaust gases to be returned in a larger quantity to the intake pipe 2 via the exhaust return passageway 21. When the solenoid 25a of three-way electromagnetic valve 25 is deenergized, on the other hand, the valve body 25b closes off an opening 24a in the negative pressure passageway 24 and opens the aperture 25c, as a result of which the atmosphere is introduced to the negative pressure chamber 23b of the negative pressure-responsive device 23. At such time the pressure differential across the diaphragm 23a becomes approximately zero, so that the diaphragm 23a is urged and displaced by the spring 23d, thereby moving the exhaust return valve 22 in the closing direction. If the duty ratio is set to zero so that the solenoid 25a of three-way electromagnetic valve 25 is kept deenergized continuously, the return valve 22 will be fully closed to cut off the flow of returning exhaust gases.

The solenoid 25a of three-way valve 25 is electrically connected to the ECU 5.

The mechanism 20 further includes a valve lift sensor 28 coupled to the diaphragm 23a of the negative pressure-responsive device 23 for sensing the amount of deviation of diaphragm 23a, namely the degree to which the valve 22 actually opens. This sensor 28 is also electrically connected to the ECU 5.

As will be described below in greater detail, the ECU 5 determines, based on the coolant temperature value sensed by the coolant temperature sensor 12, whether operation of the exhaust gas recirculation control system should be started, determines what the operating condition of the engine 1 is based on engine operating parameter signals from the aforementioned sensors when the exhaust return control system has started, and supplies the three-way electromagnetic valve 25 with an on/off signal so as to null an offset between a command value LCMD specifying the degree to which the exhaust return valve 22 is to be opened and an actual valve opening value LACT indicating the degree to which the valve 22 actually opens. The valve opening command value VCMD is set as a function of the absolute pressure PBA inside the intake pipe and the engine rotational speed Ne, and the actual valve opening value LACT is sensed by the valve lift sensor 28. The ECU 5 also supplies the electromagnetic valve 10 in the secondary air supply passageway 9 with an on/off signal on the basis of the oxygen concentration value sensed by the $O_2$ sensor 16, thereby controlling the duty of the electromagnetic valve 10 in such a manner that the air-fuel ratio of the mixture attains a desired value appropriate to the operating condition in which the engine is operating.

Figure 2:
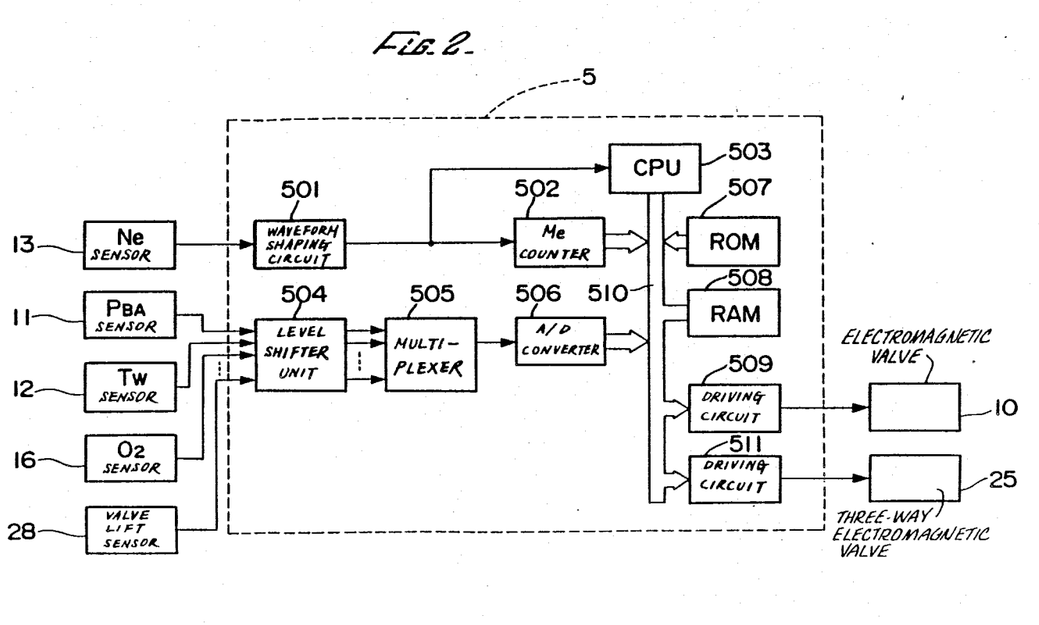
FIG. 2 is a block diagram illustrating the internal construction of an electronic control unit (ECU) included in the arrangement of FIG. 1.

The internal construction of the ECU 5 of FIG. 1 is illustrated in the block diagram of FIG. 2. The signal indicative of the rotational speed of the engine obtained from the Ne sensor 13 has its waveform shaped by a waveform shaping circuit 501 and then it is applied as the TDC signal to a central processing unit (hereinafter referred to as the "CPU") 503 wherein it is applied as interrupt signals for starting execution of programs shown in the flowcharts of FIGS. 3 and 4. The shaped Ne signal is also supplied to an Me counter 502. The latter counts the time interval between successive input signals from the Ne sensor, and the value Me of the count recorded thereby is proportional to the reciprocal of the rotational speed Ne of the engine. The Me counter 502 applies the counted value Me to the CPU 503 via a data bus 510. The output signals from the absolute pressure (PBA) sensor 11, coolant temperature sensor 12, $O_2$ sensor 16 and valve lift sensor 28, are shifted to a predetermined voltage level by a level shifter unit 504 before being successively inputted to an A/D converter 506 by a multiplexer 505. The A/D converter 506 successively converts the level-shifted output signals from the aforementioned sensors 11, 12, 16, 28 into digital signals which are then fed into the CPU 503 via the data bus 510.

The CPU 503 is connected to a read-only memory (ROM) 507, a random-access memory (RAM) 508 and driving circuits 509, 511. The RAM 508 temporarily stores the results of processing performed by the CPU 503. The ROM 507 stores a control program, described below, executed by the CPU 503 to control exhaust return, a program of an intake air temperature judgment subroutine, described below, executed by the CPU 503 to estimate whether the engine intake air temperature is high or low based on the output value from the coolant temperature sensor 12, and a map of basic lift values LMAP preset as a function of the absolute pressure (PBA) inside the intake pipe and the rotational speed Ne of the engine.

In accordance with the control program, and as will be described in further detail below, the CPU 503 determines operating conditions of the engine 1 depending on the output signals from the aforementioned engine operating parameter sensors, and provides the driving circuit 511 with the on/off control signal to control the on/off action of the three-way electromagnetic valve 25 when the engine is determined to be in predetermined conditions, thereby controlling the amount of exhaust gases to be returned. The CPU 503 also decides the valve opening period for the control valve 10 on the basis of output signals from engine operating parameter sensors such as $O_2$ sensor 16, absolute pressure (PBA) sensor 8, and Ne sensor 13, and outputs a signal indicative of the valve opening period to the driving circuit 509 via the data bus 510. In response, the driving circuit 509 supplies the control valve 10 with a driving signal that opens the valve 10 for the valve opening period. The driving circuit 511 supplies the three-way electromagnetic valve 25 with an on/off driving signal to turn the valve 25 on or off.

The method of judging engine intake air temperature according to the invention is characterized by the following criteria:

(i) When the engine coolant temperature Tw is lower than a first predetermined value $Tw_1$ (e.g. 33° C.) at the start of the engine, it is presumed that the engine intake air temperature will be at a low value (hereinafter referred to merely as the "low value") which will result in a low degree of atomization of the fuel being supplied to the engine 1 until a predetermined period of time (e.g. 120 sec) elapses from the engine start.

(ii) When the engine coolant temperature Tw rises above a second predetermined value $Tw_2$ (e.g. 58° C.) by the time the predetermined time period elapses, it is presumed, immediately upon the elapse of the predetermined time period, that the engine intake air temperature is at a high value (hereinafter referred to merely as the "high value") which will not cause a decline in the atomization of the fuel.

(iii) If the engine coolant temperature Tw rises above a third predetermined value $Tw_5$ (e.g. 83° C.), it is presumed that the engine intake air temperature will be at the high value, immediately at the time the coolant temperature Tw rises above the third predetermined value $Tw_5$.

By virtue of the criteria (ii) and (iii), the method of the invention enables earlier starting of the exhaust gas recirculation operation after the engine start and even if the engine coolant temperature has not risen above a predetermined value (e.g. 75 degrees Celsius), as compared with the conventional method, referred to herebefore, the latter judging that the engine intake air temperature is at the high value only after the engine coolant temperature exceeds the predetermined value (e.g. 7° C.).

Figure 3:
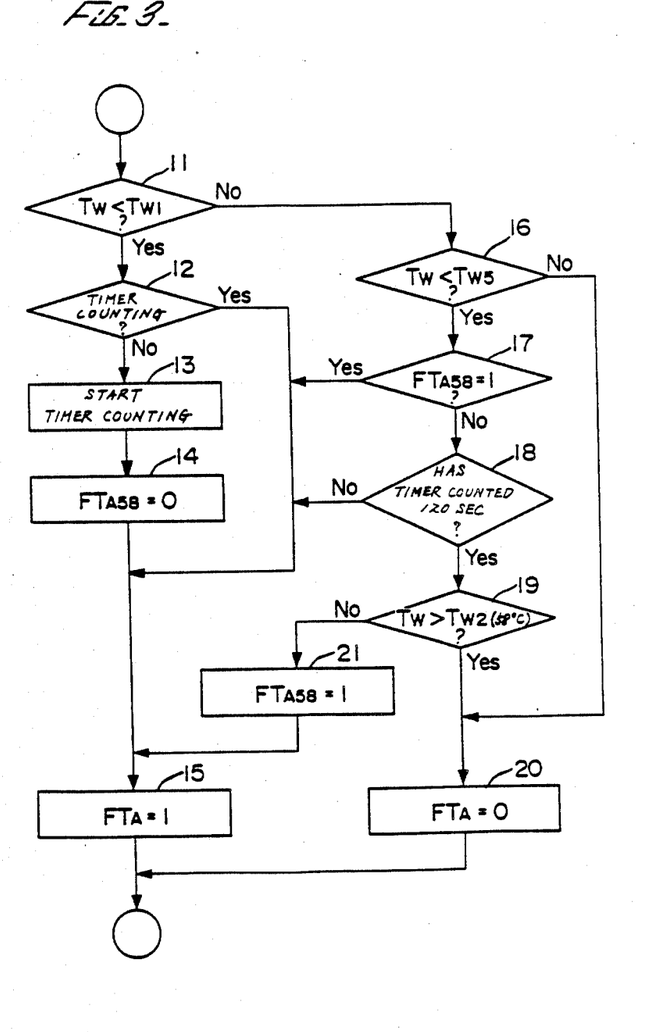
FIG. 3 is a program flowchart illustrating a subroutine for judging engine intake air temperature in accordance with the method of the invention.

FIG. 3 is a program flowchart of a subroutine for executing the aforementioned operation for judging engine intake air temperature. The program is executed by the CPU 503 of FIG. 2 each time each TDC signal pulse is inputted to the CPU 503.

When the subroutine begins, namely when the subroutine is executed for the first time by starting the engine, it is determined at a step 11 whether the engine coolant temperature Tw is lower than the first predetermined value $Tw_1$ (33° C.). Since the engine coolant temperature Tw immediately after the engine start ordinarily is below the predetermined value $Tw_1$, a YES answer will be received at the step 11 and then the program proceeds to a step 12, which calls for the CPU 503 to determine whether a timer is counting. The answer at this step is NO. This is followed by a step 13, at which the timer is caused to start counting, a step 14 where a subroutine judgment flag FTA58, the details of which will be described below, is set to 0, and a step 15 where an intake air temperature judgment flag FTA is set to 1. In other words, it is presumed that the intake air temperature is at the low value. The program proceeds to the beginning of this loop following step 15.

When the engine coolant temperature Tw is found to still be lower than the first predetermined value $Tw_1$ when the loop is executed again, YES answers are received at the steps 11, 12, the steps 13, 14 are skipped and the intake air temperature judgment flag FTA is set to 1 at the step 15, just as in the initial execution of the loop.

With the passage of time, the engine coolant temperature Tw rises and surpasses the first predetermined value $Tw_1$ for the first time, resulting in a NO answer at the step 11. When this occurs, the program proceeds to a step 16, at which it is determined whether the engine coolant temperature Tw is lower than the third predetermined value $Tw_5$ (83° C.).

The purpose of this determination is to decide that the atomization of the fuel has taken place reliably when the engine coolant temperature Tw exceeds the predetermined value $Tw_5$ (83° C.), whereupon it may be presumed that the intake air temperature is high so that the intake air temperature judgment flag FTA can be set to 0 on a priority basis at a step 20. By providing the step 16, it can be rapidly inferred that the intake air temperature is at the high value, as in a case where the engine coolant temperature rises sufficiently before the timer has counted the predetermined time period.

In the present execution of the loop, a YES answer is received at the step 16 and the program proceeds to a step 17. Here it is determined whether the subroutine judgment flag FTA58 is 1. In this case the answer is NO and the program proceeds to a step 18, at which it is determined whether the timer caused to start counting at the step 13 has finished counting the predetermined time period (120 sec). If the answer here is NO, then the program proceeds to the step 15 and the intake air temperature judgment flag FTA has set to 1, meaning that the intake air temperature is at the low value. The loop is then executed again.

When a YES answer is received at the step 18 with the passage of time, the program proceeds to a step 19, at which it is decided whether the engine coolant temperature Tw is higher than the second predetermined value $Tw_2$ (58° C.). This step is executed only when the coolant temperature Tw at engine start is higher than the first predetermined value $Tw_1$ (33° C.) and, moreover, the engine coolent temperature Tw following passage of the predetermined time period is lower than the third predetermined value $Tw_5$ (83° C.), as set forth above. When the answer at the step 19 is YES, it is inferred that the intake air temperature is at the high value and the intake air temperature judgment flag FTA is set to 0 at the step 20, thus ending the present program. By providing the step 19, even if the engine coolant temperature Tw has not risen above a predetermined value (e.g. 75° C), referred to later, above which the exhaust gas recirculation control can be effected, the same control can be started immediately after the lapse of the predetermined time period with the engine coolant temperature above the second predetermined value (58° C.).

If a NO answer is received at the step 19, namely if the engine coolant temperature Tw is still low even when the predetermined period of time (120 sec) has elapsed after the engine start, then the intake air temperature is estimated to be at the low value, the subroutine judgment flag FTA58 is set to 1 at a step 21, and the intake air temperature judgment flag FTA is set to 1 at the step 15, after which the present program is ended.

The subroutine judgment flag FTA58 is for expressing the fact that, when the flag has been set to 1, the intake air temperature is construed to be low as the result of judging intake air temperature based on the amount by which the engine coolant temperature rises by the time the predetermined time period elapses. By setting the flag FTA58 to 1, the steps 11, 16, 17 and 15 are executed repeatedly from the next loop onward until the engine coolant temperature Tw rises above third the predetermined value $Tw_5$ (83° C.).

It should be noted that when the engine coolant temperature Tw is higher than the first predetermined temperature $Tw_1$ (33° C.) at engine start (i.e. when a NO answer is received at the step 11 the first time the loop is executed), the initial value of the subroutine judgment flag FTA58 is set to 0 at the step 14 and the timer is not operating. Therefore, the steps 11, 16, 17, 18, 15 are executed repeatedly until the engine coolant temperature Tw rises above the predetermined temperature $Tw_5$ (83° C.). During the repeated execution of these steps, the intake air temperature is continuously construed to be at the low value (FTA=1).

Figure 4:
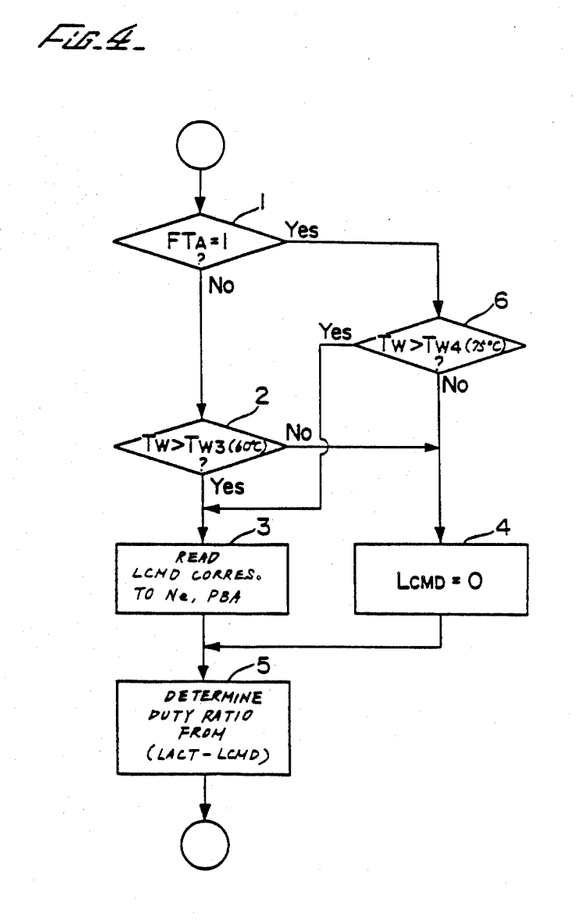
FIG. 4 is a program flowchart illustrating an exhaust gas recirculation control method to which the method of the invention is applied.

FIG. 4 is a flowchart of an exhaust gas recirculation control method performed depending on the intake air temperature estimated by the intake air temperature judgment subroutine described above. The present program is executed by the CPU 503 of FIG. 2 each time each pulse of the TDC signal is inputted to the CPU 503.

Step 1 of the flowchart calls for a determination as to whether the flag FTA is 1. The value of this flag is decided by the aforementioned intake air temperature judgment subroutine that determines whether the engine intake air temperature has the low value. If the answer received at the step 1 is NO, namely that the intake air temperature is estimated to be at the high value by the above-mentioned subroutine (FTA=1), then exhaust gas recirculation control is performed at steps 2 through 5. It is determined at the step 2 whether the engine coolant temperature Tw is higher than a predetermined value $Tw_3$ (60° C.). When the answer received here is YES, the aforementioned valve opening command value LCMD is decided at the step 3 in accordance with the engine rotational speed Ne and intake pipe absolute pressure PBA. A NO answer at the step 2 causes the command value LCMD to be set to 0 at the step 4. The program proceeds to the step 5 from the steps 3 and 4. A duty ratio value for controlling the operation of the three-way electromagnetic valve 25 of FIG. 1 is decided at the step 5 in dependence upon the difference between the valve opening command value LCMD, which has been decided by step 3 or 4, and the detected valve opening value LACT from the valve lift sensor 28 of FIG. 1. The present program is ended following the step 5.

If a YES answer is received at the step 1, namely if the engine intake air temperature is estimated to be at the low value by the intake air temperature judgment subroutine (FTA=1), then exhaust gas recirculation control is performed through steps 6, 3, 4, 5. The step 6 calls for a determination as to whether the engine coolant temperature Tw is above a predetermined value $Tw_4$ (e.g. 75° C.), which is higher than the predetermined value $Tw_3$ (60° C.). When the answer is YES, the step 3 is executed, followed by the step 5; when the answer is NO, the step 4 is executed, followed by the step 5.

In this way, according to the method of the invention, when the engine coolant temperature is estimated to be at the high value by the intake air temperature judgment subroutine (FTA=0), the exhaust gas recirculation control is started immediately when the engine coolant temeperature Tw exceeds the predetermined value $Tw_3$ which is lower than the predetermined value $Tw_4$, i.e. the conventional control-initiating temperature, thus eliminating delay in starting the exhaust gas recirculation.

In the illustrated embodiment, the invention is applied to control of exhaust gas recirculation as a form of controlling engine operation depending on engine intake air temperature. However, the invention is not limited to this embodiment and can achieve control of engine operation by exhaust purification control or the like. For example, the invention can be applied to so-called air-fuel ratio feedback control in which the air-fuel ratio is controlled in accordance with the $O_2$ sensor output so as to attain a stoichiometric mixture ratio.

As set forth above, according to the invention, engine temperature prevailing at engine start is sensed as well as elapsed time from engine start. The engine intake air temperature is then estimated on the basis of the sensed engine temperature and sensed elapsed time, and the operation of the engine is controlled in accordance with the estimated engine intake air temperature. This makes possible control of engine operation in accordance with intake air temperature without a delay in starting the control and at low cost achieved by dispensing with a special intake air temperature sensor.

What is claimed is:

1. A method of controlling the operation of an internal combustion engine comprising the steps of:
    (a) sensing a temperature of said engine at a moment at which said engine is started;
    (b) sensing elapsed time from the moment at which said engine is started;
    (c) sensing said temperature of said engine at a moment at which the sensed elapsed time coincides with a predetermined period of time;
    (d) estimating the temperature of intake air being supplied to said engine, on the basis of the difference between values of said temperature of said engine sensed at the steps (a) and (c); and
    (e) controlling the operation of said engine in accordance with the estimated temperature of the intake air.

2. A method as claimed in claim 1, further including determining whether the temperature of said engine sensed at the moment at which said engine is started is lower than a predetermined value, and when the sensed temperature of said engine is determined to be lower than said predetermined value, estimating that the temperature of the intake air is at a low value which would result in an insufficient degree of atomization of fuel being supplied to said engine, until said predetermined period of time elapses from the moment at which said engine is started.

3. A method as claimed in claim 1, wherein said step (d) comprises: determining whether the temperature of said engine sensed at the moment at which said engine is started is lower than a first predetermined value; determining whether the temperature of said engine rises above a second predetermined value higher than said first predetermined value upon elapse of said predetermined period of time from the moment at which said engine is started, if the temperature of said engine sensed at the moment at which said engine is started is determined to be lower than said first predetermined value; when the temperature of said engine sensed at the moment at which said predetermined period of time elapses is determined to be lower than said second predetermined value estimating that the temperaure of the intake air is a low value which would result in an insufficient degree of atomization of fuel being supplied to said engine, and when the sensed temperature of said engine is determined to be higher than said second predetermined value when said predetermined period of time elapses, estimating that the temperature of the intake air is at a high value which would result in a sufficient degree of atomization of fuel being supplied to said engine.

4. A method as claimed in claim 3, further including sensing said temperature of said engine at and from the moment said engine is started, determining whether the sensed temperature of said engine is higher than a third predetermined value higher than said second predetermined value, and when the sensed temperature of said engine is higher than said third predetermined value even before said predetermined period of time elapses, immediately estimating that the temperature of the intake air is at said high value.

5. A method as claimed in claim 1, wherein said temperature of said engine is the temperature of coolant for said engine.

6. A method as claimed in claim 1, wherein said step (e) comprises controlling exhaust gas recirculation to an intake system of said engine.

7. A method of controlling the operation of an internal combustion engine comprising the steps of:
    (a) sensing a temperature of said engine from a moment at which said engine is started, and elapsed time from the moment at which said engine is started;
    (b) estimating the temperature of intake air being supplied to said engine, on the basis of the sensed temperature of said engine and the sensed elapsed time; and
    (c) controlling the operation of said engine in accordance with the estimated temperature of the intake air, wherein said step (b) comprises: determining whether the sensed temperature of said engine is lower than a first predetermined value at the moment at which said engine is started; determining whether the sensed temperature of said engine rises above a second predetermined value higher than said first predetermined value upon elapse of a predetermined period of time from the moment at which said engine is started, if the sensed temperature of said engine is determined to be lower than said first predetermined value; when the sensed temperature of said engine is determined to be lower than said second predetermined value when said predetermined period of time elapses, estimating that the temperature of the intake air is at a low value which would result in an insufficient degree of atomization of fuel being supplied to said engine; and when the sensed temperature of said engine is determined to be higher than said second predetermined value when said predetermined period of time elapses, estimating that the temperature of the intake air is a high value which would result in a sufficient degree of atomization of fuel being supplied to said engine.

8. A method of controlling the operation of an internal combustion engine comprising the steps of:
(a) sensing a temperature of said engine from a moment at which said engine is started, and elapsed time from the moment at which said engine is started;
(b) estimating the temperature of intake air being supplied to said engine, on the basis of the sensed temperature of said engine and the sensed elapsed time; and
controlling the operation of said engine in accordance with the estimated temperature of the intake air,
wherein said step (b) further comprises determining whether the sensed temperature of said engine is higher than a third predetermined value higher than said second predetermined value, and when the sensed temperature of said engine is higher than said third predetermined value even before said predetermined period of time elapses, immediately estimating that the temperature of the intake air is at said high value.

* * * * *